United States Patent Office 2,809,472
Patented Oct. 15, 1957

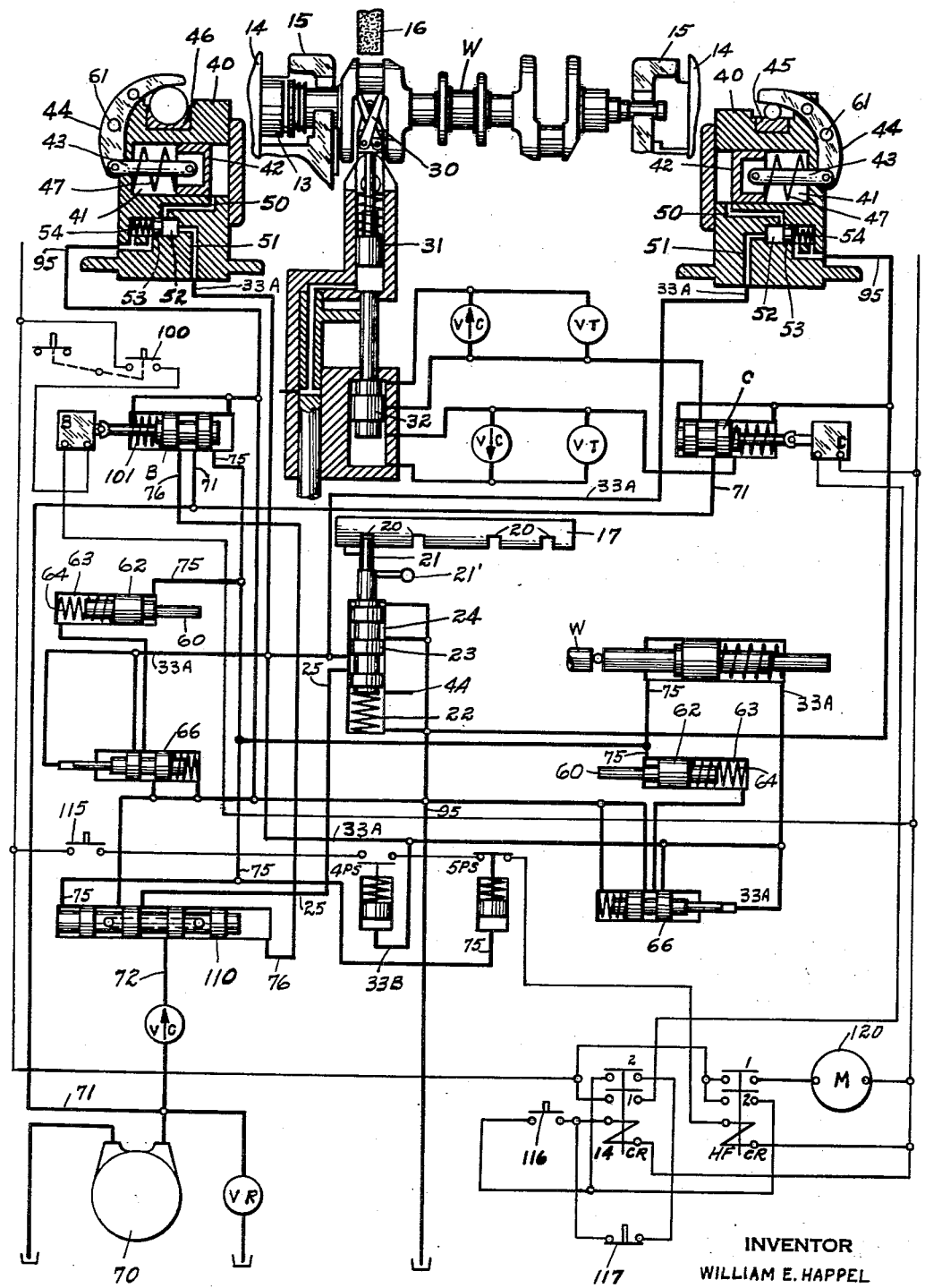

2,809,472

INTERLOCKING WORK DRIVE AND CLAMPING MECHANISM

William E. Happel, Waynesboro, Pa., assignor to Landis Tool Company, Waynesboro, Pa.

Application November 25, 1955, Serial No. 548,962

6 Claims. (Cl. 51—105)

This invention relates to grinding machines particularly machines for grinding automotive crankshafts and more particularly to the interlocking of the clamp devices with the work drive.

In the grinding of crankshafts, it is sometimes necessary or desirable to turn the crank in the clamping fixtures for angular indexing while the clamp is rotating. It is necessary to open the crank only enough to permit the index movement. Provision must be made to limit the extent of opening of the clamp fixture for this purpose.

It is therefor an object of this invention to provide means whereby both the crankshaft clamping mechanism and the means for limiting the opening of the clamp are in proper position before the work drive mechanism can function.

Another object is to provide an axial locating means operable only on the portion to be ground, and movable into operative relation with the grinding wheel only while the work drive motor is operating.

Another object is to provide means for opening the clamp to a slight extent sufficient to permit rotation of the workpiece in the clamp each time a new portion of said workpiece is moved axially into position in approximate alignment with the grinding wheel.

The drawing is a combination of an electric and hydraulic diagram.

W indicates the work, in this case, a crank supported in a conventional clamping device such as that shown in Patent 1,816,750, granted July 28, 1931, and Patent 1,755,937, granted April 22, 1930. The workpiece W may be located axially in approximate alignment with the grinding wheel 16 by means of a spacing bar 17 mounted on a movable carriage (not shown) but on which are also mounted headstocks 14 having spindles 13 rotatably mounted therein for supporting the clamp fixtures 15. Notches 20 in said spacing bar are engaged by plunger 21 to locate workpiece W in each of several axially spaced positions. Said plunger is urged upwardly by spring 22. A valve 23 in cylindrical bore 24 forms a part of plunger 21 and operates in conjunction with said plunger to control certain functions of the machine.

The axial locating means consists of a pair of feeler fingers 30 for engaging opposed annular surfaces on the workpiece, a piston 31 for urging said feeler into engaging said surfaces, and a piston 32 for moving said feeler and said fixture toward and from operative relation with the workpiece. This locating device is described in detail in application, Serial No. 524,930, filed July 28, 1951. The clamping fixture consists of a main body member 40 having a cylindrical bore 41 in which the piston 42 is slidably mounted. A link 43 connects said piston to one end of a clamp arm 44 pivotally mounted on said body 40. The other end of said clamping arm engages and holds the said workpiece on clamping blocks 45 and 46 in the body member 40. The pressure fluid is introduced through a passage 50 to the head end of bore 41 to urge piston 42 against spring 47 to actuate clamping arm 44. In order for the fluid under pressure to reach passage 50, it must pass from passage 51 through a cylindrical bore 52 in which is mounted a piston 53.

Piston 53 is shifted by pressure in passage 51 to open passage 50. Said piston is normally held in position to close passage 50 by a spring 54. When the pressure in passage 51 is shut off, piston 53 is shifted by spring 54 to connect passage 50 with exhaust passage 95.

The means for limiting the opening of the clamping fixture for indexing consists of a latch member in the form of a plunger 60 on a piston 62 slidably mounted in a cylinder 63 and held in operative position by spring 64. Said plunger enters a hole 61 in the clamping arm 44 and restricts the opening of said arm more than a predetermined amount sufficient to permit rotation of the work for indexing.

*Operation*

In practice, the apparatus described above is part of an automatically operated machine and its functions are therefore initiated automatically as part of the machine cycle. For the purpose of illustration, I have disclosed certain elements as being controlled by manually operated control members.

In positioning axially spaced portions of a workpiece, plunger 21 must be withdrawn from notch 20 in spacing bar 17 to permit the movement of the workpiece. Depressing plunger 21 by handle 21' actuates valve 23 which connects line 33A with exhaust passage 4A. With the drop of pressure in line 33A, piston 53 will be shifted by spring 54 to connect passage 50 with exhaust lines 95 which are arranged to permit a rapid exhaust of fluid from the clamping cylinders 41. When the plunger enters the next notch, pressure from line 25 is again directed to line 33A, passing through passages 51 and 50 and cylinder 41 to actuate piston 42 to clamp the workpiece. When the clamps are first closed before the grinding of the first portion of the shaft, latch valve solenoid B is actuated by manual switch 100. Valve B is shifted to the left against spring 101 to direct pressure from pump 70 and line 71 to line 76 to shift the clamp valve 110 to the left as shown in the drawing. Said valve then directs fluid under pressure from line 72 through line 25 through index plunger valve 23 and line 33A to cylinder 41 to clamp work W. The pressure fluid in line 33A passes through valve 66 to assist spring 64 to actuate latch 60. Said pressure then shifts valve 66 to the right to connect latch cylinder 63 with exhaust 95 so that said latch may be withdrawn to release the clamp. Spring 64 continues to hold latch 60 in operative position. The pressure in line 33A also acts through line 33B to close clamp pressure switch 4PS. With valve B in position shown, line 75 is connected to exhaust fluid from latch cylinders 63. Pistons 62 and plungers 60 are shifted by spring 64, the plungers enter in hole 61 in clamp arms 44.

With clamping pressure acting to close clamping arm 44 and clamp pressure switch 4PS, and exhaust pressure in line 75 permitting the closing of latch pressure switch 5PS, the circuit to HF—CR may be completed by closing push button switch 115. Contact 1HF—CR completes a circuit to work drive motor 120. Thereafter, 14CR may be energized through push button switch 116 and HF—CR2. 14CR1 completes a circuit to solenoid C shifting valve C to direct fluid under pressure to the head end of locator, positioning piston 32 and moves fingers 30 into operative relation with the workpiece W. Thus, the locating operation cannot take place unless the work is rotating. When the locating function is completed, said locator can be withdrawn by depressing stop switch 117, deenergizing 14CR and opening the circuit to solenoid C. With solenoid C deenergized, the valve C is shifted to the left to direct fluid under pressure to the rod end of piston 32 to retract the locating fingers 30.

I claim:
1. In a machine tool, means for rotatably supporting a workpiece including a headstock, a spindle rotatably mounted therein, an electric motor for driving said spindle, a work clamping device mounted on said spindle and including a clamping arm, a hydraulic motor for actuating said clamping arm, a latch for preventing more than a limited opening of said clamp in the event of pressure failure, hydraulic means for withdrawing said latch, resilient means for urging said latch into operative position, a pressure switch connected to the hydraulic circuit for said clamp motor and having a normally open contact in the circuit to said electric motor, a pressure switch in the hydraulic circuit to said latch having a normally closed contact in the circuit to said electric motor whereby said electric motor can function only with said clamp closed and latched.

2. In a grinding machine for grinding a cylindrical portion of a workpiece having opposed shoulders or flanged portions, a grinding wheel, a work support, means for rotatably supporting a workpiece thereon, means for rotating said work including a motor and a control relay for said motor, a work locating device having means for co-operating with said shoulder portions for determining the relative axial position of said shoulder portions and said grinding wheel, means for moving said work locating device into and out of operative relation with said work portion including a motor, a connection between the control means for said work drive motor and said locator shifting motor whereby said locator may move into operative position only after said work drive motor is in operation.

3. In a machine tool, means for rotatably suporting a workpiece including a headstock, a spindle rotatably mounted therein, an electric motor for driving said spindle, a work clamp mounted on said spindle and including a clamping arm, a hydraulic motor for actuating said arm, a hydraulic circuit for said clamp motor, a source of fluid under pressure for said circuit, a pressure switch connected to the hydraulic circuit for actuating said clamp motor and having a normally open contact in the electric circuit to said work drive motor whereby said clamp must be closed in order for said motor to operate, a work locating device and a hydraulic motor for moving same toward and away from operative relation with the work, a solenoid valve for supplying fluid under pressure alternately to opposite sides of said motor, and control means made operable by the means for starting said work drive motor for actuating said solenoid valve to move said locator into operative relation with the workpiece.

4. In a machine tool, means for rotatably supporting a workpiece including a headstock, a spindle rotatably mounted therein, an electric motor for driving said spindle, a work clamping device mounted on said spindle and including a clamping arm, a hydraulic motor for actuating said clamping arm, a latch for preventing opening said clamp in the event of pressure failure, hydraulic means for withdrawing said latch, an electric circuit and means for closing same for energizing said electric motor when said clamping arm and said latch are in operative position.

5. In a chucking device for a machine tool, a work gripping member, an actuating means for said member comprising a piston and cylinder, a connection between said piston and said work gripping member, a spring for moving said piston in one direction, means for directing fluid under pressure to move said piston in the opposite direction, a source of fluid under pressure and a passage for directing fluid under pressure to said cylinder, a spring actuated valve in said passage operable under pressure to permit the passage of fluid to said cylinder, said valve being operable in the absence of pressure in said passage to connect said cylinder with an exhaust outlet.

6. In a machine tool, means for rotatably supporting a workpiece including a headstock, a spindle rotatably mounted therein, an electric motor for driving said spindle, a work clamping device mounted on said spindle and including a clamping arm, a hydraulic motor for actuating said clamping arm, a latch in the path of movement of said clamping arm for permitting a partial opening of said clamp for angular indexing of the work, hydraulic means for withdrawing said latch, an electric circuit, and means for closing same for energizing said electric motor when said clamping arm and said latch are in operative position.

References Cited in the file of this patent
UNITED STATES PATENTS

| | | |
|---|---|---|
| 2,455,002 | Foudy | Nov. 30, 1948 |
| 2,559,431 | Hollengreen | July 3, 1951 |
| 2,638,719 | Balsiger | May 19, 1953 |